(12) United States Patent
Carnell et al.

(10) Patent No.: US 7,591,944 B2
(45) Date of Patent: Sep. 22, 2009

(54) SULPHIDED ION EXCHANGE RESINS

(75) Inventors: Peter John Herbert Carnell, Cleveland (GB); Nicola Young, County Durham (GB); Peter Wood, Cleveland (GB)

(73) Assignee: Johnson Matthey PLC, London (GB)

( * ) Notice: Subject to any disclaimer, the term of this patent is extended or adjusted under 35 U.S.C. 154(b) by 535 days.

(21) Appl. No.: 10/502,236

(22) PCT Filed: Jan. 17, 2003

(86) PCT No.: PCT/GB03/00184

§ 371 (c)(1),
(2), (4) Date: Mar. 30, 2005

(87) PCT Pub. No.: WO03/062176

PCT Pub. Date: Jul. 31, 2003

(65) Prior Publication Data

US 2005/0161370 A1    Jul. 28, 2005

(30) Foreign Application Priority Data

Jan. 23, 2002  (GB) ................................. 0201457.9
Jan. 23, 2002  (GB) ................................. 0201461.1

(51) Int. Cl.
 $C10G\ 25/00$    (2006.01)
 $C10G\ 25/06$    (2006.01)
 $C10G\ 17/00$    (2006.01)
 $B01J\ 20/26$    (2006.01)

(52) U.S. Cl. ............... 208/299; 208/208 R; 208/251 R; 208/304; 502/402

(58) Field of Classification Search ............ 208/208 R, 208/299, 251 R, 304; 502/402
See application file for complete search history.

(56) References Cited

U.S. PATENT DOCUMENTS

| 2,592,523 A | | 4/1952 | Ayers et al. |
| 4,011,882 A | * | 3/1977 | Nivens et al. ............ 137/15.05 |
| 4,614,592 A | | 9/1986 | Googin et al. |
| 4,675,169 A | * | 6/1987 | Hass ......................... 423/563 |
| 5,401,393 A | | 3/1995 | Whitehurst et al. |
| 6,027,636 A | | 2/2000 | Poirier |
| 6,048,451 A | * | 4/2000 | Huff et al. ................... 208/237 |
| 6,059,962 A | * | 5/2000 | Alexander et al. .......... 208/238 |
| 6,221,241 B1 | * | 4/2001 | Carnell et al. ........... 208/251 R |

FOREIGN PATENT DOCUMENTS

| DE | 224 038 A1 | | 6/1985 |
| EP | 0 319 615 A1 | | 6/1989 |
| FR | 2 512 051 | | 3/1983 |
| JP | 4-348188 | | 12/1992 |
| JP | 2002020765 A | * | 1/2002 |
| RU | 2 081 130 C1 | | 6/1997 |

OTHER PUBLICATIONS

International Search Report dated Jun. 10, 2003, from International Application No. PCT/GB03/00184.

* cited by examiner

*Primary Examiner*—Walter D Griffin
*Assistant Examiner*—Natasha Young
(74) *Attorney, Agent, or Firm*—RatnerPrestia

(57) ABSTRACT

A method of making a sulphided ion exchange resin from an ion exchange resin containing primary or secondary amino group comprises passing a non-aqueous liquid, e.g. a hydrocarbon, feedstock containing elemental sulphur or organic, or inorganic, di-or poly-sulphides through a bed of an ion exchange resin containing primary or secondary amino groups, and so unsulphided ion exchange resins containing primary or secondary amine groups may be used to remove such elemental sulphur or sulphur compounds from liquid, e.g. hydrocarbon, feedstocks. The sulphided ion exchange resins may be used to remove elemental mercury or organic mercury compounds from liquid, e.g. hydrocarbon, streams.

11 Claims, No Drawings

SULPHIDED ION EXCHANGE RESINS

This application is the U.S. national phase application of PCT International Application No. PCT/GB03/00184, and claims priority of British Patent Application Nos. 0201457.9 and 0201461.1.

This invention relates to sulphided ion exchange resins and their production and use.

Accordingly the invention provides a sulphided ion exchange resin containing primary or secondary amino groups.

Elemental sulphur or organic, or inorganic, di-or poly-sulphides may be present as a contaminant in liquids especially hydrocarbons. One source of such contamination is as a result of the transport of hydrocarbons via pipelines. In some cases batches of different hydrocarbons are pumped along a pipeline in sequence and as a result "clean" hydrocarbons such as gasoline may be contaminated by materials such as hydrogen sulphide from the previous use of the pipeline for a "dirty" hydrocarbon such as kerosene. Pipeline scale and/or ingress of small amounts of air can cause the oxidation of contaminants such as hydrogen sulphide to elemental sulphur. Sublimation of elemental sulphur may also result in contamination of gaseous hydrocarbons.

Removal of such elemental sulphur and sulphur compounds is desirable. We have found that ion exchange resins containing primary or secondary amino groups can absorb significant amounts of elemental sulphur.

Accordingly the present invention also provides a method of making sulphided ion exchange resins containing primary or secondary amino groups comprising passing a non-aqueous liquid feedstock containing elemental sulphur or organic, or inorganic, di-or poly-sulphides through a bed of an ion exchange resin containing primary or secondary amino groups.

The process may thus be employed for the removal of such sulphur or sulphur compounds present as contaminants in liquid, e.g. hydrocarbon, feedstocks.

The absorption may be effected at temperatures in the range −10° C. to +100° C. and under sufficient pressure that the feedstock is in the liquid, by which term we include gases in the "dense phase", state at the desired absorption temperature. By the term "dense phase" we mean that the fluid is at a pressure that is above the upper dew point curve and at a temperature above the critical temperature (but generally below the temperature of the maxcondentherm point—which is the maximum temperature of the dew point and bubble point curves).

Amine-containing ion exchange resins as supplied often contain a significant amount of water. We have found that such water can retard the absorption of elemental sulphur. Accordingly it is preferred that the ion exchange resin is dried, e.g. by extraction with a suitable solvent such as methanol, before use. The ion exchange resin, of which Amberlyst A.21 is a typical example, is preferably employed in the form of a fixed bed of shaped units, e.g. spherical granules, preferably having maximum and minimum dimensions in the range 0.5 to 10 mm.

As a result of the aforesaid process, the ion exchange resin becomes sulphided. In addition to absorbing the elemental sulphur, the ion exchange resin may catalyse the decomposition of elemental sulphur species such as the cyclic $S_8$ species, forming polysulphides and hydrogen sulphide. Consequently it may be desirable to pass the feedstock through a bed of a suitable hydrogen sulphide absorbent after passage through the bed of the ion exchange resin. Suitable hydrogen sulphide absorbents include zinc and copper compounds such as oxides, hydroxides and basic carbonates. A particularly suitable absorbent that is effective at the temperatures mentioned above comprises agglomerates of co-precipitated copper, zinc and aluminium compounds and may contain a suitable binder, e.g. a calcium aluminate cement.

Liquid feedstocks that may be treated include any non-aqueous liquids that are liquid under the operating conditions. Preferred hydrocarbons include natural gas liquids and gasoline.

If desired, the ion exchange resin can be regenerated by periodic treatment with a suitable acid such as hydrochloric acid. However under favourable conditions, the ion exchange resin may have the capacity to absorb a sufficient amount of sulphur that it is economic to replace the resin when laden with the absorbed sulphur rather than to provide for regeneration. Alternatively the sulphided ion exchange resin may be used to adsorb elemental mercury and/or organic mercury compounds as described below.

In addition to, or instead of, sulphur compounds, elemental mercury and/or organic mercury compounds may be present as a contaminant in non-aqueous fluids, e.g. hydrocarbon, streams, e.g. gas or oil as extracted from the earth. The presence of mercury or organic mercury compounds is undesirable since elemental mercury can cause severe corrosion problems while organic mercury compounds tend to be toxic and/or readily decomposed to elemental mercury. Removal of such elemental mercury and organic mercury compounds is desirable. We have found that sulphided ion exchange resins containing primary or secondary amino groups, for example as obtained in the aforesaid process, can absorb significant amounts of mercury.

Accordingly the present invention provides a method for the removal of mercury and organic mercury compounds from a non-aqueous liquid, e.g. hydrocarbon, feedstock comprising passing the feedstock through a bed of a sulphided ion exchange resin containing primary or secondary amino groups.

As for the original sulphiding process, the absorption may be effected at temperatures in the range −10° C. to +100° C. and under sufficient pressure that the feedstock is in the liquid or "dense phase", state at the desired absorption temperature.

In addition to absorbing the elemental mercury, the sulphided ion exchange resin may remove organic mercury compounds by catalysing their decomposition with the absorption of the mercury thus formed or by other means.

Where the liquid feedstock stream also contains sulphur, the ion exchange resin may be sulphided in situ. However, in order to ensure that the mercury is absorbed, it is preferred that at least the inlet portion of the bed of ion exchange resin is sulphided before a mercury containing stream is passed through the bed.

Hydrocarbons that may be treated include any that are liquid under the operating conditions. Preferred hydrocarbons include natural gas liquids and gasoline.

The invention is illustrated by the following examples.

EXAMPLE 1

A stirred vessel was charged with 200 ml of toluene in which about 10 mg of sulphur had been dissolved at room temperature. 5 g of an ion exchange resin, Amberlyst A.21 which contains methylamino groups, in the form of spherical granules of diameter about 1.5 mm was added to the vessel and stirring continued. Samples of the solution were taken for analysis at intervals. As no significant reduction in the sulphur content occurred after 165 minutes, a further 5 g of the ion exchange resin was added and stirring, and intermittent sampling, continued for a further 3 hours. Stirring was then stopped and the vessel left to stand for 7 days. The sulphur content of the solution is shown in the Table 1.

TABLE 1

| Time | Total sulphur content (mg/l) |
|---|---|
| 0 min | 45.5 |
| 10 min | 46.1 |
| 30 min | 46.1 |
| 165 min | 44.1 |
| 210 min | 34.3 |
| 300 min | 18.2 |
| 345 min | 8.3 |
| 7 days | 0 |

It is seen that the sulphur was only absorbed slowly.

EXAMPLE 2

The procedure of example 1 was repeated without the addition of the second 5 g 5 of ion exchange resin and the vessel was left to stand for 3 days. The results are shown in Table 2.

TABLE 2

| Time | Total sulphur content (mg/l) |
|---|---|
| 0 min | 44.1 |
| 30 min | 43.2 |
| 60 min | 44.0 |
| 180 min | 40.7 |
| 240 min | 35.8 |
| 315 min | 23.0 |
| 360 min | 14.5 |
| 3 days | 3.5 |

EXAMPLE 3

Analysis of the Amberlyst A 21 ion exchange resin as used in Examples 1 and 2 revealed that its initial water content was about 50% by weight. In order to reduce the water content, 10 g of the Amberlyst A21 resin was extracted in a separating funnel with two 50 ml aliquots of methanol. The methanol was then drained off and the resin dried in a stream of nitrogen. The procedure of Example 2 was then repeated using the extracted resin and a solution of 13 mg of sulphur in 200 ml of toluene. The results are shown in Table 3.

TABLE 3

| Time (min) | Total sulphur content (mg/l) |
|---|---|
| 0 | 44.5 |
| 30 | 37.0 |
| 90 | 0.04 |
| 220 | 0 |

It is seen that the sulphur was rapidly absorbed.

EXAMPLE 4

To assess the capacity of the Amberlyst A 21 ion exchange resin for sulphur, 5 g of the resin was added to a solution of 2527 mg of sulphur in 200 ml of toluene. Samples of the resin were removed at intervals, air dried and then analysed for total sulphur. The results are shown in Table 4.

TABLE 4

| Time (hours) | sulphur content (mg/cm$^3$) |
|---|---|
| 5.5 | 14 |
| 7 | 19 |
| 24 | 41 |
| 51 | 51 |

The invention claimed is:

1. A method of making a sulphided ion exchange resin from an ion exchange resin containing primary or secondary amino groups and the concomitant removal of elemental sulphur from a liquid hydrocarbon feedstock, comprising passing said feedstock containing elemental sulphur through a bed of the ion exchange resin containing primary or secondary amino groups, thereby forming a sulphided ion exchange resin, wherein water is removed from the ion exchange resin before use.

2. A method according to claim 1 wherein the liquid hydrocarbon feedstock is passed through a bed of a hydrogen sulphide absorbent after passage through the bed of the ion exchange resin.

3. A method according to claim 1 wherein the ion exchange resin is in the form of a fixed bed of shaped units having maximum and minimum dimensions in the range 0.5 to 10 mm.

4. A method according to claim 1 wherein liquid hydrocarbon feedstock is contacted with the ion exchange resin bed at temperatures in the range −10° C. to 100° C. under sufficient pressure that the feedstock is in the liquid state.

5. A method according to claim 1 wherein the ion exchange resin is periodically regenerated by treatment with an acid.

6. A method according to claim 1 wherein the liquid hydrocarbon is selected from the group consisting of natural gas liquids and gasoline.

7. A method according to claim 1 wherein said liquid hydrocarbon feedstock further comprises mercury or inorganic mercury compounds, and wherein at least the inlet portion of the bed of an exchange resin is sulphided before a mercury containing stream is passed through the bed, thereby to remove said mercury or organic mercury compounds from said liquid hydrocarbon feedstock.

8. A method for the removal of mercury and organic mercury compounds from a liquid hydrocarbon feedstock comprising passing the feedstock through a bed of a sulphided ion exchange resin obtained by the method according to claim 1.

9. A method according to claim 8 wherein the liquid hydrocarbon is selected from the group consisting of natural gas liquids and gasoline.

10. A method according to claim 8 wherein the ion exchange resin is in the form of a fixed bed of shaped units having maximum and minimum dimensions in the range 0.5 to 10 mm.

11. A method according to claim 8 wherein the liquid hydrocarbon feedstock is contacted with the ion exchange resin bed at temperatures in the range −10° C. to 100° C. under sufficient pressure that the feedstock is in the liquid state.

* * * * *

UNITED STATES PATENT AND TRADEMARK OFFICE
CERTIFICATE OF CORRECTION

| | | |
|---|---|---|
| PATENT NO. | : 7,591,944 B2 | Page 1 of 1 |
| APPLICATION NO. | : 10/502236 | |
| DATED | : September 22, 2009 | |
| INVENTOR(S) | : Carnell et al. | |

It is certified that error appears in the above-identified patent and that said Letters Patent is hereby corrected as shown below:

On the Title page, Item [57], ABSTRACT, at line 3, "group" should read --groups--.

At column 4, line 33, "-10°C to 100°C" should read -- -10°C to +100°C--.

At column 4, line 60, "-10°C to 100°C" should read -- -10°C to +100°C--.

Signed and Sealed this

Twenty-sixth Day of January, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,591,944 B2 | Page 1 of 1 |
| APPLICATION NO. | : 10/502236 | |
| DATED | : September 22, 2009 | |
| INVENTOR(S) | : Carnell et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1205 days.

Signed and Sealed this

Fourteenth Day of December, 2010

David J. Kappos
*Director of the United States Patent and Trademark Office*